INVENTOR:
CHARLES J. ADAMS,
BY David M. Schiller
ATTORNEY

United States Patent Office 3,351,732
Patented Nov. 7, 1967

3,351,732
ELECTRIC WELDING DEVICE
Charles J. Adams, Bloomington, Ill., assignor to General Electric Company, a corporation of New York
Filed July 22, 1964, Ser. No. 385,102
30 Claims. (Cl. 219—86)

ABSTRACT OF THE DISCLOSURE

A resistance welder includes a support structure which mounts the movable electrode means for pivotal movement between spaced rest and second positions, and for translatory movement between the second position and a weld position. The translatory movement is at a slower rate and over a shorter distance than the pivotal movement. Means are also provided to adjust the electrode in the direction of its translatory movement.

---

This invention relates to electric welding devices and particularly, to precision electric resistance microwelding devices primarily suited for bonding miniature components such, for example, as fine wire to a metallic film on a glass or a ceramic substrate.

In the welding of fragile miniature components, it is very desirable that provision be made for moving the movable electrode slowly onto the workpiece to avoid impact forces and thereby minimize the possibility of damage to the work, and also to permit precise positioning of the electrode on the work. On the other hand, it is very desirable to effect rapid movement of the electrode through a major part of its path of travel between its rest or retracted position and its work engaging position so as to minimize the time required for the weld cycle. Prior art devices have not incorporated such desiderata but instead have either moved the electrode quickly throughout its path of travel thereby increasing the possibility of damage to the work, or have moved the electrode slowly throughout its path of travel resulting in an undesirably long weld cycle.

In the field of resistance welding it is desirable that the movable electrode structure exhibit low inertia to permit rapid movement thereof in a direction to relieve forces resulting from expansion of the work during heating thereof, and also to permit a subsequent rapid follow-up movement thereof to maintain pressure on the work when the work is rendered plastic as the weld is made. It is also desirable to make provision for applying a readily adjustable follow-up force to the movable electrode. Previous attempts to provide low inertia movable electrode structures and adequate and adjustable follow-up forces have involved complex and costly arrangements which have not been entirely satisfactory.

In order to accommodate work pieces of different heights it is desirable to effect a convenient and rapid adjustment of the movable electrode relative to the work to assure that proper pressure is applied by the electrode to workpieces of various heights.

It is also very important that the drive means provided to effect movement of the movable electrode be designed to permit very quick termination of movement of the electrode at any position in its path of travel. Prior art welding devices have failed to incorporate drive means capable of effecting these functions satisfactorily.

Although attempts have been made to incorporate certain of the above features in prior designs, such efforts have generally been unsatisfactory and no previous single design has included all such features in a compact, accurate and low cost arrangement.

It is therefore a primary object of the invention to provide a novel and improved precision microwelding device for bonding miniature components.

It is another object of the invention to provide a novel and improved welding device wherein the movable electrode is accurately and rapidly moved from its rest position onto the work without applying damaging impact forces to the work.

It is still another object of the invention to provide a welding device including a novel and improved movable electrode structure exhibiting low inertia permitting rapid relief and follow-up movements of the electrode.

It is a further object of the invention to provide a novel and improved welding device of low cost and compact design having provision for applying an adjustable follow-up force to the movable electrode to effect a very rapid follow-up movement of the electrode with the work surface as such becomes plastic during a welding operation.

It is a still further object of the invention to provide a novel and improved welding device including means for effecting a rapid initial movement of the electrode from its rest position towards the work through a substantial part of its path of movement, and for effecting a slower and shorter final movement of the electrode onto the work.

It is still another object of the invention to provide a welding device including novel and improved drive means for controlling movement of the electrode relative to the work and which is capable of very quickly terminating movement of the electrode at any position in its path of travel.

In carrying out the invention in one form, a resistance welding device is provided which is primarily suited for the bonding of miniature components. The device includes a supporting structure or base which supports a carrier for adjustment in vertical directions relative to the base, and a frame is mounted for limited vertical sliding movement with respect to the carrier and the base between spaced parts of the carrier. Resilient means are provided for biasing the frame to an upper rest position. The frame pivotally supports an elongated arm assembly including elongated deflectable rod means carrying at its free end electrode means engageable with a workpiece supported on the base. Suitable drive means is mounted on the carrier and is operatively connected to the arm assembly for effecting pivotal movement of the arm assembly and the electrode means between an upper rest or retracted position wherein the electrode means is spaced from the workpiece and a lower weld position wherein the electrode means engages the workpiece and deflects the rod means.

The arm assembly and the frame include engageable parts which are spaced when the arm assembly and the frame are in their rest positions and which engage during pivotal movement of the arm assembly to effect downward movement of the arm assembly and the frame as a unit against the bias of the resilient means in response to continued operation of the drive means. The deflectable rod means is formed of electroconductive material and has terminals adapted for energization from a voltage source to conduct current to the electrode means. The drive means is preferably in the form of a dynamically braked, reversible electric motor controlled by limit switches operated in response to arrival of the electrode means at its two extreme positions, and also controlled by manually operable switches actuated by an operator. A guide is mounted for adjustment longitudinally of the rod means to permit variation of the spring force exerted by the rod means on the electrode means.

Other objects and advantages of the invention will become apparent from the following description taken in conjunction with the accompanying drawings in which.

With reference to the drawing, the welding device of the present invention includes a base 10 supporting at one end a support or anvil 12 which carries a workpiece 14 comprising two parts 15 and 17 to be bonded. The base also carries at its other end support means 19 for supporting electrode means 20 for movement between a rest or retracted position shown in FIG. 1 wherein the electrode means 20 is spaced from the workpiece, and a weld position shown in FIG. 3 wherein the electrode means engages the workpiece. Movement of the electrode means is effected in response to operation of drive means 21 operatively connected to a part of the support means.

Figure 2:
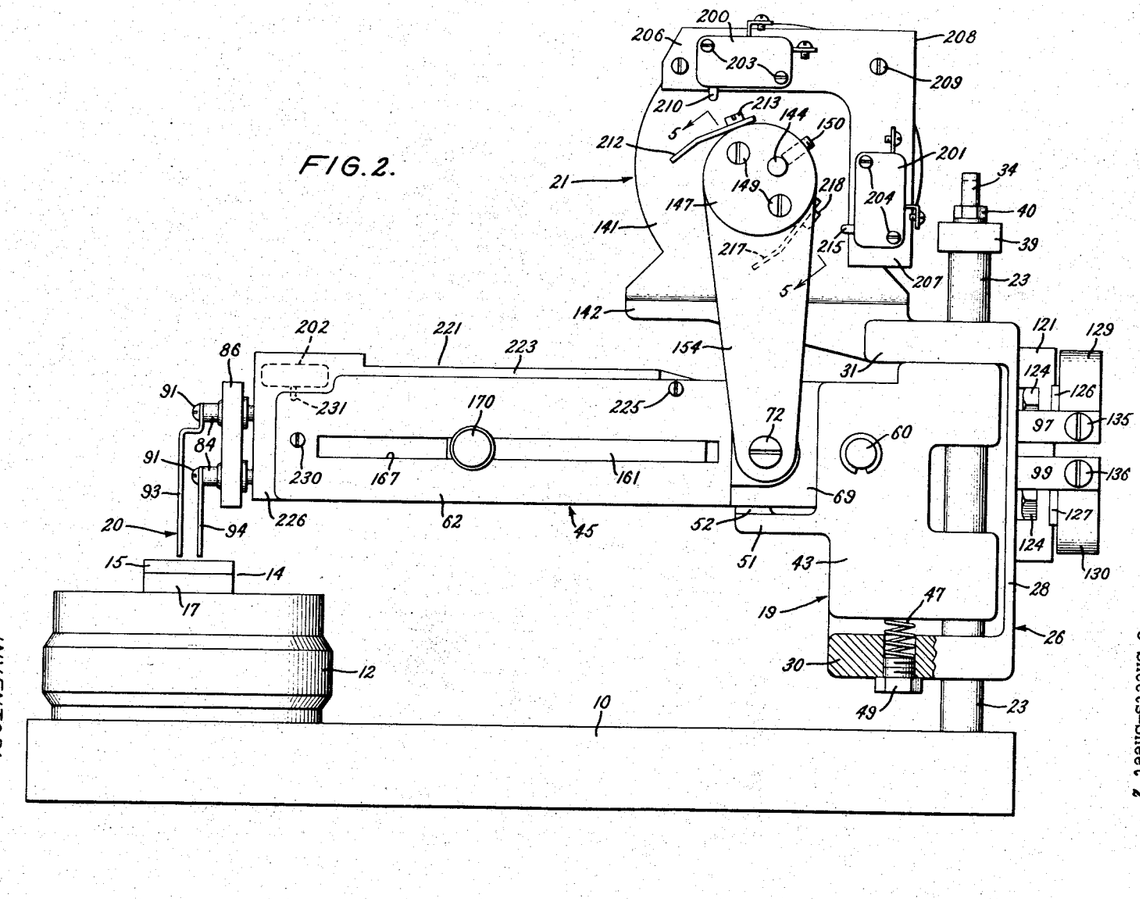
FIG. 2 is a view in elevation similar to FIG. 1 showing the electrode supporting arm at the end of its pivotal movement wherein it engages the frame.
Figure 3:
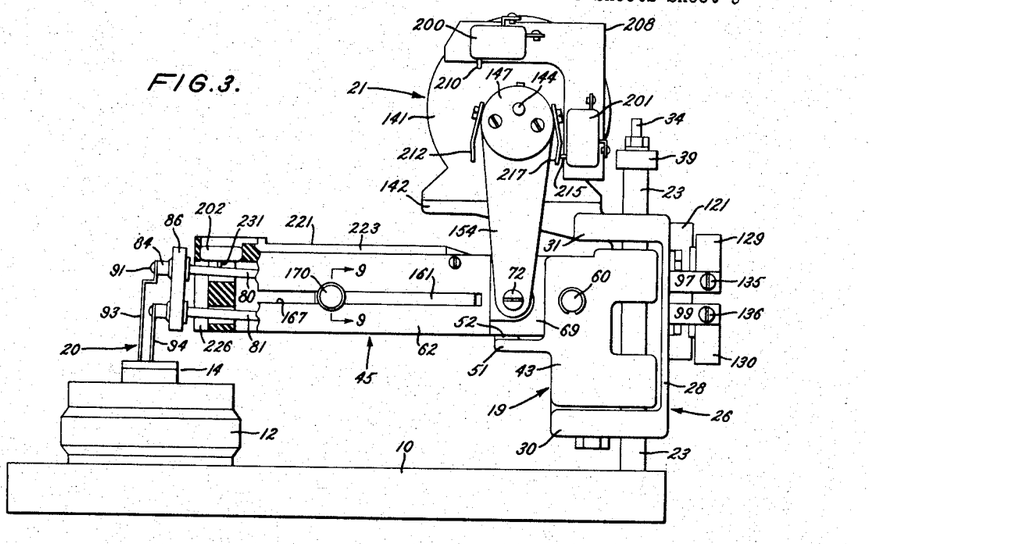
FIG. 3 is a view in side elevation similar to FIGS. 1 and 2 showing the electrode supporting arm in its lower weld position wherein the movable electrode means engage the work.
Figure 4:
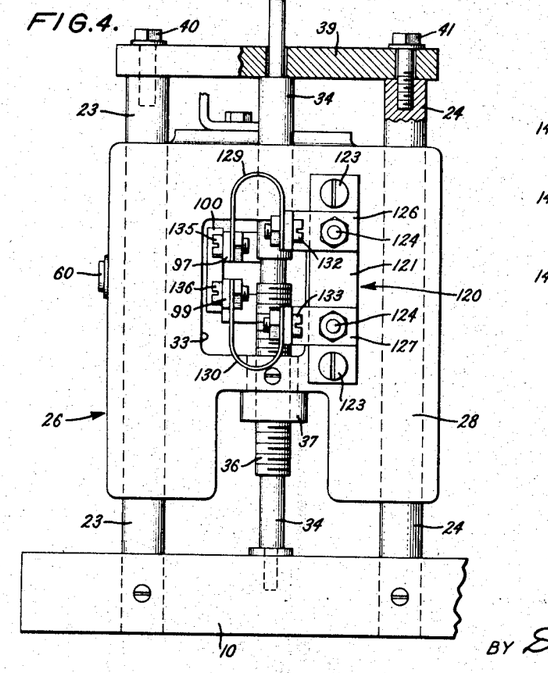
FIG. 4 is a view in rear elevation of the device of FIGS. 1-3 with parts shown in section.

More specifically, with reference to FIGS. 1-4, the support means 19 is illustrated as including a pair of posts 23 and 24 which are secured to the base in any suitable manner in horizontally-spaced, vertically extending relation, and which slidably mount a carrier 26 having vertically extending openings through which the posts extend. The carrier includes a rear vertically extending wall 28 and a pair of horizontally extending vertically spaced legs 30 and 31 projecting from the wall towards the anvil 12. As best shown in FIG. 4, the wall 28 of the carrier includes a generally rectangular opening 33 through which electrical connections to the electrode means extend as will appear hereinafter.

In accord with the invention the carrier 26 is mounted for vertical adjustment relative to the base to permit accommodation of various height workpieces. For this purpose, the base rotatably supports a vertically extending shaft 34 which includes a threaded portion 36 (FIG. 4) in threaded engagement with a nut 37 secured in any suitable manner to the carrier. At its upper end the shaft 34 projects through an opening in a transverse bar 39 which extends across the ends of the posts 23 and 24. The posts are connected to the bar 39 by screws 40 and 41 which extend through openings of the bar 39 into threaded engagement with the posts 23 and 24.

Figure 1:
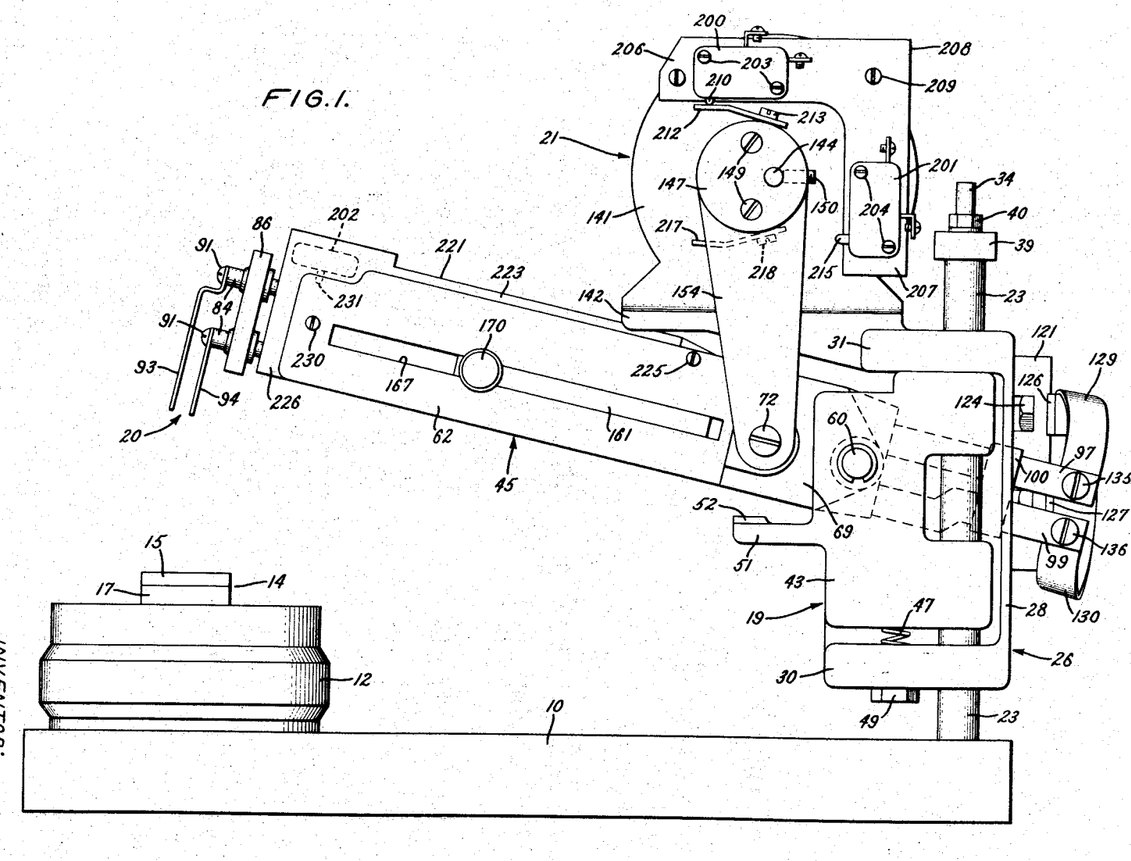
FIG. 1 is a view in side elevation of a welding device constructed in accordance with the invention and showing the electrode supporting arm in its upper rest or retracted position.

In order to mount the electrode means for movement relative to the workpiece between its rest and weld positions, the invention provides a frame or follower 43 which is part of the support means and which is slidably mounted on the posts 23 and 24 in vertical directions between the legs 30 and 31 of the carrier. As will be described more fully hereinafter, the frame 43 pivotally supports an arm assembly 45 which carries the electrode means 20. The frame is slidable relative to the carrier between an upper rest position shown in FIG. 1 wherein the upper surface of the frame engages the lower surface of the leg 31 of the carrier, and a lower weld position shown in FIG. 3 wherein the lower surface of the frame is slightly spaced from the upper surface of the leg 30 of the carrier. Two coil springs 47, only one of which is shown in FIGS. 1 and 2, are positioned between and engage the lower surface of the frame and the ends of a pair of screws 49 threaded in recesses formed in the leg 30 of the carrier to urge the frame towards its upper rest position. The frame includes a horizontal extending ledge 51 having a vertical projection 52 positioned to engage the lower surface of the arm assembly when the arm assembly is pivoted downwardly from its rest position to a horizontal position in response to operation of the drive means 21. Continued operation of the drive means 21 after engagement of the arm assembly and the projection 52 results in downward translatory movement of the frame 43 and the arm assembly 45 as a unit relative to the carrier against the bias of the springs 47. The frame includes a wall 54 (FIG. 10) extending perpendicular to the arm assembly 45 and containing an opening 56 in alignment with the opening 33 in the wall 28 of the carrier.

Figure 6:
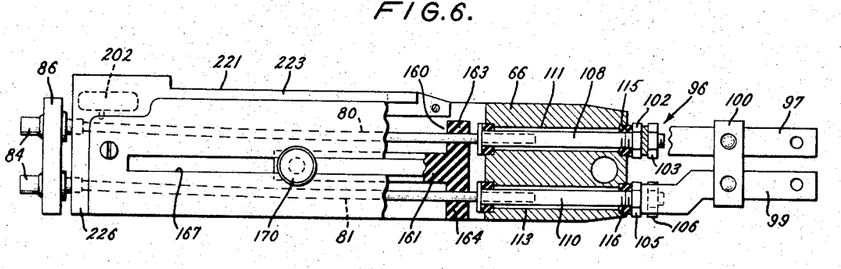
FIG. 6 is an enlarged view in side elevation of the electrode supporting arm with parts broken away and with parts shown in section.
Figures 8, 9, 10:
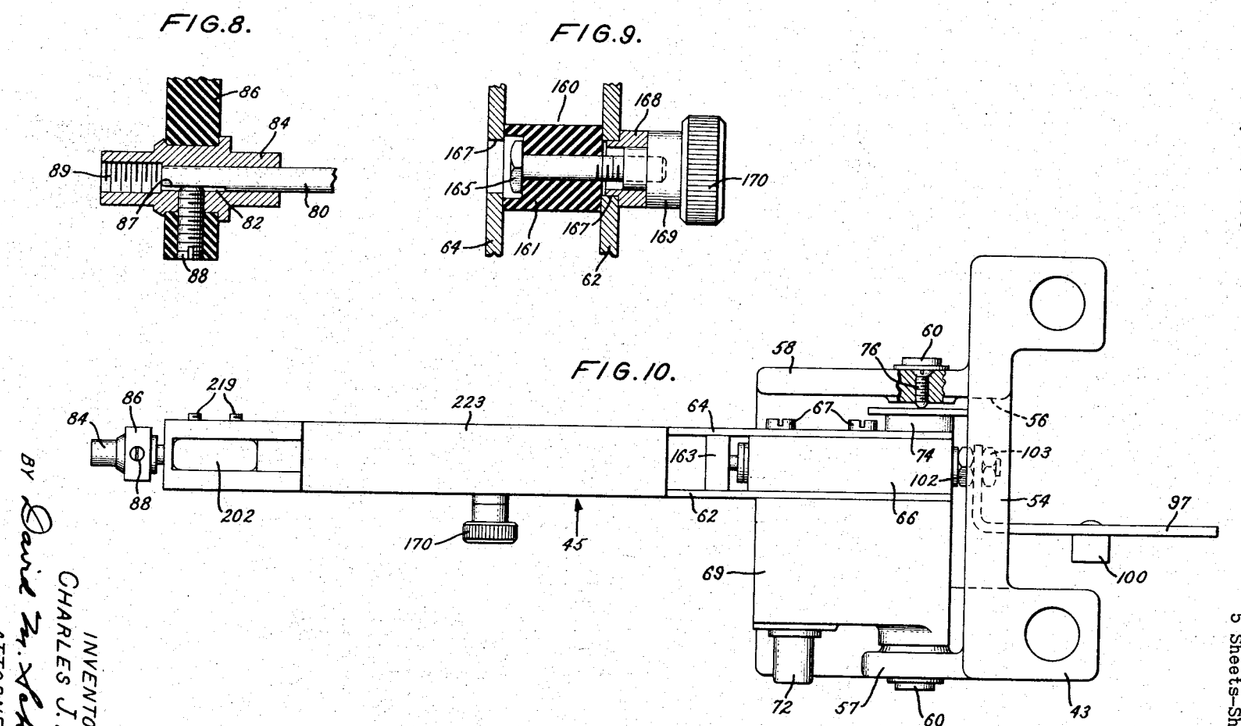
FIG. 8 is a view in section showing the connection between the deflectable rod means and the electrode holder supported thereby.
FIG. 9 is a view taken along the line 9—9 of FIG. 3 showing in section the guide employer to vary the follow up force developed by the deflectable rod means in response to engagement of the electrode means with the work.
FIG. 10 is a view in top plan showing the frame and the electrode supporting arm pivotally mounted thereto.

In order to pivotally mount the arm assembly, the frame 43 is formed with a pair of spaced parallel sides 57 and 58 (FIG. 10) which extend from the wall 54 and which support a pin 60 extending therebetween and also extending through a part of the arm assembly which is located between the spaced sides 57 and 58. Details of the arm assembly are shown in FIGS. 6 and 10, and as best shown in FIG. 10, the arm assembly comprises a pair of elongated parallel side plates 62 and 64 positioned in spaced relation by an insulating spacer 66 which is located between the side plates at the end thereof adjacent the frame and which is secured to the side plates by means of screws 67 extending into threaded engagement with a hollow block 69 at the outer surface of the plate 62. The block 69 carries a pin 72 at its exposed side which serves to provide a pivotal connection between the arm assembly and the drive means as will presently appear. A spacer 74 is secured in any suitable manner to the outer surface of the plate 64 and is engaged by the tip of a screw 76 threaded into an opening of the side 58 of the frame. The pin 60 extends through aligned openings in the side plates 62 and 64, the spacer 66, the block 69 and the spacer 74 so as to mount the arm assembly for pivotal movement about the axis of the pin 60.

The arrangement is such that the movable electrode structure exhibits very low inertia. This is desirable in that it permits rapid movement of the electrode means away from the work to relieve forces resulting from expansion of the work during heating thereof, and also allows a subsequent rapid follow-up movement of the electrode means to maintain pressure on the work when such is rendered plastic as the weld is made. In order to provide a low inertia movable electrode structure and to provide a rapid follow-up movement thereof, the electrode means is mounted on the free end of deflectable rod means comprising a pair of elongated space deflectable rods 80 and 81 forming part of the arm assembly and anchored at the pivotally mounted ends of the side plates 62 and 64. The rods extend through the space between the sides plates to the free ends of the side plates. As best shown in FIGS. 3 and 8, the free ends of the rods 80 and 81 project into passages 82 formed in bushings 84 which are located in openings in an insulating electrode holder 86. The rods 80 and 81 are provided with terminal flat portions 87 engaged by screws 88 in transverse passages of the holder 86 and the bushings 84. The bushings 84 include threaded passages 89 aligned with and communicating with the passages 82 and adapted to receive screws 91 which engage and secure a pair of electrode tips 93 and 94 in operative positions. The tips 93 and 94 constitute a parallel or single-side electrode assembly wherein the welding current follows a path which may be traced from one of the electrodes, through the workpiece and back to the other electrode. With this arrangement, the welding is advantageously done from one side of the workpiece. It is understood that the invention is not limited to the single-side electrode assembly shown but is applicable also to other types of electrode assemblies.

In accord with the present invention the welding current is supplied to the electrode tips 93 and 94 through the deflectable rods 80 and 81. To this end, the screws 91 are formed of electroconductive material and are of sufficient length to engage the rods 80 and 81 which also are formed of electroconductive material. The rods 80 and 81 are electrically connected to a bus bar assembly 96 (FIG. 6) comprising a pair of vertically spaced flat generally L-shaped bus bars 97 and 99 positioned by means of an insulating block 100 attached to the long legs of the bars. The short legs of the bars 97 and 99 extend into the paper as viewed in FIG. 6 and are positioned respectively between a pair of spaced nuts 102, 103 and 105 and 106 threaded on threaded ends of screws 108 and 110 respectively which project through spaced passages 111 and 113 formed in the spacer 66. The inner ends of the screws 108 and 110 contain passages in which are secured in any suitable manner the fixed ends of the rods 80 and 81. Then nuts 102 and 105 bear against end surfaces of insulators 115 and 116 which are seated on shoulders formed in the passages 111 and 113 and through which the screws 108 and 110 extend.

In order to supply electric current to the electrode assembly the bus bar assembly 96 is electrically connected to a terminal block 120 mounted on the rear face of the wall 28 of the carrier. As best shown in FIG. 4, the assembly 120 includes an insulating block 121 which is secured by screws 123 to the wall 28 of the carrier and which mounts by terminal screws 124 a pair of L-shaped electroconductive bars 126 and 127. A pair of U-shaped electroconductive flexible straps 129 and 130 are secured at their right hand ends to the bars 126 and 127 by screw and nut assemblies 132 and 133 and at their left hand ends to the bus bars 97 and 99 by screw and nut assemblies 135 and 136. The screws 124 serve as terminals and are connected to a suitable source of alternating voltage 138 (FIG. 7) through a suitable control switch 139 which controls application of weld current to the electrodes 93 and 94. The bus bars 97 and 99 extend through the aligned openings 33 and 56 of the walls 28 and 54. Also, when the arm assembly is in its rest position shown in FIG. 1, the straps 129 and 130 are in flexed conditions.

Figure 5:
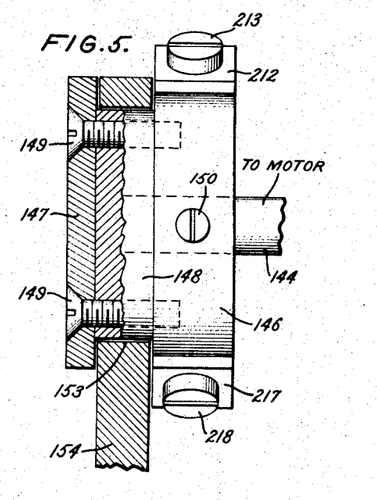
FIG. 5 is a view taken along the line 5—5 of FIG. 2 with parts shown in section.

In order to effect movement of the electrode means between its rest and weld positions, the invention provides novel and improved electricaly controlled drive means 21 operatively connected to the arm assembly 45. In the embodiment illustrated, the drive means comprises a dynamically braked, reversible electric motor 141 mounted on a flat base 142 secured in any suitable manner to the upper leg 31 of the carrier 26. As best shown in FIG. 5, the motor 141 includes a motor shaft 144 which extends through eccentric openings formed in a bearing 146 and in a plate 147 secured to the face of a restricted part 148 of the bearing as by screws 149. The shaft 144 is fixed to the bearing 146 by means of a screw 150 extending through the side of the bearing into engagement with the shaft. The restricted portion 148 of the bearing extends loosely through an opening 153 formed in the upper end of a link 154 which has a lower end as viewed in FIG. 1 containing an opening through which extends the pin 72 for pivotally mounting the link 154 to the arm assembly 45. As best shown in FIGS. 1–3, the motor shaft 144 is parallel to and radially displaced from the center line of the bearing so that rotation of the motor shaft effects an eccentric movement of the bearing about the axis of the shaft 144.

The movements of the electrode means in response to energization of the motor will now be described. Initially, it will be assumed that the motor is deenergized and that the arm assembly 45 is in its rest position shown in FIG. 1. If the motor is now energized in a direction to rotate the shaft 144 in a counterclockwise direction as viewed in FIG. 1, the bearing 146 and the plate 147 will be eccentrically rotated in such counterclockwise direction about the axis of the shaft 144. Such eccentric rotation results in substantially vertical movement of the link 154 downwardly which effects counterclockwise pivotal movement of the arm assembly 45 about the pin 60. Such pivotal movement of the arm assembly 45 continues until the lower surface of the arm assembly engages the projection 52 on the frame 43 at which time the arm assembly 45 is horizontally extending as shown in FIG. 2 and the electrodes are just slightly spaced from the workpiece 14. The above described pivotal movement of the arm assembly is effected rapidly by rotation of the motor shaft through a small fraction of a complete revolution.

Continued rotation of the motor shaft in the counterclockwise direction results in downward translatory movement of the frame 43 and the arm assembly 45 as a unit from their positions shown in FIG. 2 to their positions shown in FIG. 3. During the above described translatory movement the springs 47 are compressed and the electrode tips 93 and 94 are brought into engagement with the upper surface of the work 15. As the motor shaft continues to rotate, the rods 80 and 81 are deflected upwardly as shown in FIG. 3 to store a spring force which urges the electrodes downwardly against the work 15. The short downward translatory movement of the arm assembly and frame from their positions of FIG. 2 to their positions shown in FIG. 3 is effected at a much slower rate than the longer pivotal movement of the arm previously described. As a result, the electrode tips are gently moved on to the part 15 which minimizes the possibility of damage thereto. The downward movement of the arm assembly and frame is terminated in a manner described hereinafter.

When the parts are in their positions shown in FIG. 3, the welding operation is initiated by closure of the switch 139 which supplies current from the source 138 to the electrode tips and 93 and 94. As the current heats the work, the work expands and the low inertia electrode structure is readily moved upwardly to relieve the resulting forces which might otherwise damage the delicate substrate on part 17. At the instant the weld is made, the upper surface of the part 15 becomes plastic and to effect a satisfactory weld, it is necessary that the electrode tips 93 and 94 maintain adequate pressure on the part 15. The spring force stored by the bars 80 and 81 as a result of their upward deflection previously described is released as the work becomes plastic to force the tips 93 and 94 downwardly against the receding material of the part 15. In this manner a rapid follow-up force is provided to maintain adequate pressure of the electrode tips on the workpiece.

When the welding operation is completed, the motor is energized to effect rotation of its shaft in a clockwise direction as viewed in FIG. 3 so that the above-described movements of the arm assembly and frame are reversed. Initially, the link 154 is elevated from its position shown in FIG. 3 to move the arm assembly 45 and the frame 43 upwardly as a unit under the expansive action of the springs 47. When the frame 43 is moved to its upper limit wherein it engages the leg 31 of the carrier, continued rotation of the motor shaft in the clockwise direction results in pivotal movement of the arm assembly 45 about the pin 60 in a clockwise direction until it reaches its rest position at which time such pivotal movement is terminated as will be described.

This then completes a full cycle of movement of the arm assembly 45.

Rapid initial pivotal movement of the arm assembly 45 is effected by reason of the link 154 extending substantially in the direction of travel of the pin 72, and also by selecting the rest or initial location of the motor shaft 144 so that its axis and the center line of the bearing 146 are in horizontal alignment as shown in FIG. 1. Further, the velocity of the electrodes is a function of the length dimension of the arm assembly 45 multiplied by the reciprocal of the distance between the pivot pins 60 and 72. In accord with the invention the length of the arm assembly 45 is selected to be as great as practical, and the distance between the pivot pins 60 and 72 is selected to be as small as practical. The subsequent slower tanslatory movement of the arm assembly 45 results from the arrangement wherein the center line of the bearing 146 during such movement is approaching the lowermost point in its path of travel and the link 154 is therefore moving at a decreasing velocity.

In accord with the invention provision is made for rapidly and conveniently adjusting the follow-up force exerted by the rods 80 and 81 upon the electrode tips 93 and 94. To this end an insulating guide 160 (FIGS. 6 and 9) is provided between the side plates 62 and 64 of the arm assembly 45, the guide 160 having a generally T-shaped configuration with a stem 161 extending horizontally as viewed in FIG. 6 and a pair of vertically extending ears 163 and 164 projecting from one end of the stem. The ears 163 and 164 include parallel spaced openings through which project respectively portions of the rods 80 and 81. At its other end the stem 161 includes a transverse opening through which extends a screw 165 (FIG. 9) which passes also through an elongated slot 167 formed in the side plate 62 and through a ferrule 168 into threaded engagement with a nut 169 located externally of the side plate 62. The nut 169 has a reduced terminal part which projects into the passage of the ferrule 168, the latter having a shouldered end section extending into the slot 167. The nut includes an enlarged knurled hand grip section 170 which can be grasped to rotate the nut relative to the screw 165 for loosening or tightening the nut against the ferrule 168. Loosening the nut 169 permits sliding movement thereof longitudinally of the slot 167 to carry the guide 160 longitudinally of the rods 80 and 81. If the guide 160 is moved towards the left as viewed in FIG. 6, the follow-up force supplied by deflection of the rods 80 and 81 resulting from engagement of the electrodes with the work is increased. With the guide 160 positioned in substantially its extreme right hand position as shown in FIG. 6, substantially a minimum follow-up force is provided. When the guide 160 has been adjusted to the desired position, the nut 169 is tightened against the ferrule 168 to fix the guide in such position. The arrangement is such that the rods 80 and 81 deflect substantially a constant amount which is approximately .05 inch regardless of the setting of the guide 160. By adjusting the guide 160 as above described the effective length of the rods is varied and an accurate, repeatable, and variable follow-up force is obtainable.

As previously pointed out, mounting of the carrier 26 on the rotatable threaded shaft 34 permits vertical adjustment of the carrier relative to the base 10 in response to rotation of the shaft 34. With the arrangement of parts previously described, rotation of the shaft 34 is effective to move all parts including the carrier 26, the motor 141 mounted thereon, the frame 43, and the arm assembly 45 as a unit with respect to the base 10. Such arrangement permits adjustment of the electrode means 20 vertically with respect to the base 10 to accommodate workpieces of various heights.

In accordance with the invention a novel circuit arrangement is provided to control energization of the motor 141. The circuit arrangement includes a plurality of limit switches positioned for actuation in response to movements of the electrode means. In the illustrated embodiment, three limit switches 200, 201 and 202 are provided. As shown in FIG. 1, the "up" and "down" limit switches 200 and 201 respectively are mounted by screws 203 and 204 on arms 206 and 207 of an L-shaped bracket 208 secured to the frame of the motor by screw 209. The switch 200 is normally closed and has a vertically reciprocable spring biased operating member 210 which is actuated upwardly by a bracket 212 fixed on the periphery of the bearing 146 by screw 213 to close the switch when the motor shaft 144 is in its position shown in FIG. 1 corresponding to the rest position of the arm assembly 45. The switch 201 is normally open and has a horizontally reciprocable spring biased operating member 215 actuated towards the right by a bracket 217 fixed by screw 218 on the bearing to close the switch when the motor shaft 144 is displaced in a counterclockwise direction from its position shown in FIG. 3. The "arm" limit switch 202 (FIGS. 3 and 10) is normally open and is mounted by screws 219 on an insulating L-shaped block 221 having a long leg 223 in the space between the side plates 62 and 64 adjacent the top thereof and secured to such side plates by a screw 225. The short leg 226 of the block 221 depends into the space between the side plates 62 and 64 adjacent the free ends thereof and is secured to the side plates by a screw 230. As best shown in FIG. 3, the short leg of the block 221 includes a pair of parallel passages beneath the switch 202 through which extend portions of the rods 80 and 81. The switch 202 includes a vertically reciprocable spring biased operating member 231 which is adapted to be actuated upwardly by the rod 80 to close the switch when the rod 80 is deflected upwardly in response to engagement of the electrode tips with the workpiece.

Figure 7:
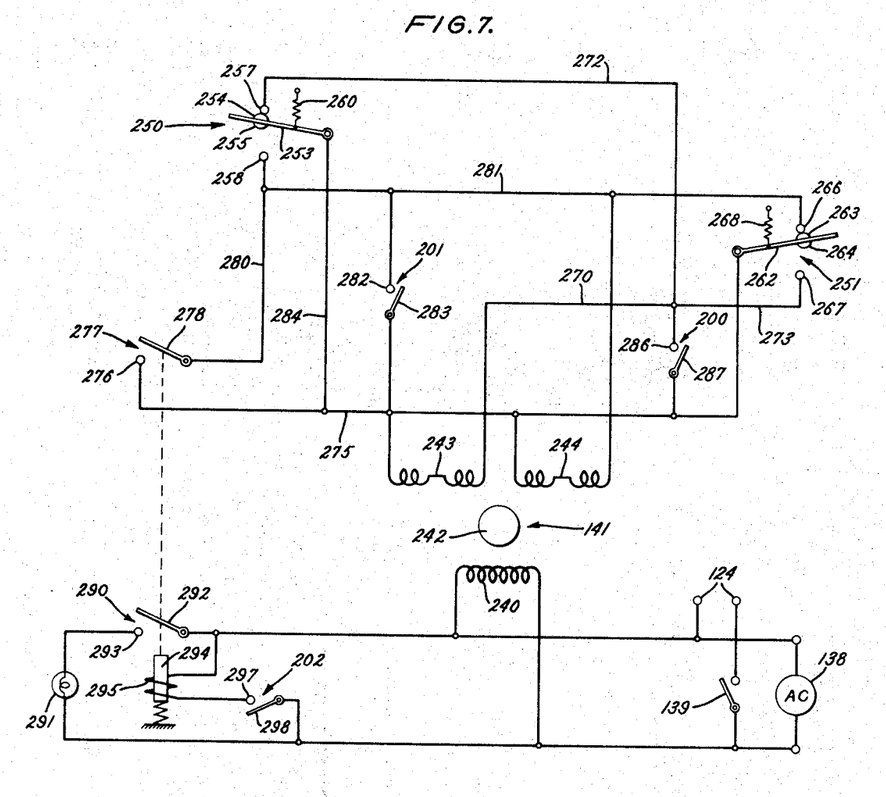
FIG. 7 is a schematic diagram of the circuit utilized to control operation of the electric motor employed in the device of FIGS. 1-3.

The improved control circuit is schematically shown in FIG. 7 and includes the motor 141 which is of the reversible shaded pole type and which is shown as comprising a field coil 240 connected across the voltage source 138 and cooperating with an armature 242 and a pair of "down" and "up" pole shading windings 243 and 244 respectively. The motor is designed to withstand continuous input electric power even in the stalled rotor condition. The several windings are arranged so that when both the pole shading windings are shorted, the armature cannot rotate. However, when the "down" winding 243 is shorted and the "up" winding 244 is open, the armature is rotated in a direction to rotate the motor shaft counterclockwise as viewed in FIG. 1 and move the electrodes downwardly towards the workpiece. On the other hand, when the "down" winding 243 is open and the "up" winding 244 is shorted, the armature is rotated in the opposite direction to rotate the motor shaft clockwise and move the electrode means upwardly away from the workpiece. Provision of the two pole shading windings results in dynamic braking of the motor in response to shorting of both windings which is very desirable.

In accord with the invention the open and shorted conditions of the pole shading windings 243 and 244 are controlled by a pair of manually operable single pole double throw type "up" and "down" switches 250 and 251 respectively as well as by the limit switches 200, 201 and 202. The "up" switch 250 is schematically shown in FIG. 7 as including a manually movable contact carrier 253 having movable contacts 254 and 255 engageable respectively with spaced fixed contacts 257 and 258. The carrier 253 is formed of electroconductive material and is biased by a spring 260 so that the contacts 254 and 257 normally engage. Similarly, the "down" switch 251 includes an electronconductive carrier 262 having contacts 263 and 264 engageable respectively with spaced fixed contacts 266 and 267. A spring 268 biases the carrier 262 upwardly so that the contacts 263 and 266 normally engage. As will presently appear, when the "down" switch 251 is actuated by depressing its carrier 262, the "down" winding 243 is shorted to effect movement of the arm assembly 45 downwardly. When the carrier 253 of the "up" switch 250 is depressed to actuate the switch, the "up" winding is shorted to effect movement of the arm assembly upwardly.

Details of the circuit shown in FIG. 7 will now be described. The "down" winding 243 has one side connected to a wire 270 which is connected to the fixed contact 257 of switch 250 through a wire 272 and which is connected to the fixed contact 267 of switch 251 through a wire 273. The other side of the "down" winding is connected to a wire 275 which leads to the carrier 262 of switch 251 and to a fixed contact 276 of a normally open switch 277 having a movable contact 278 which is moved to engage the fixed contact 276 in response to closure of the limit switch 202. The movable contact 278 is connected to the fixed contact 258 of switch 250 by a wire 280. The fixed contact 258 is also connected to the fixed contact 266 of switch 251 by a wire 281. The switch 201 is connected in parallel with the switch 277 and for this purpose includes a fixed contact 282 connected to the wire 281 and a movable contact 283 connected to the wire 275. The carrier 253 of switch 250 is connected to the wire 275 by a wire 284. The "up" winding 244 has one side connected to the wire 275 and has its other side connected to the wire 281. The "up" limit switch 200 includes a fixed contact 286 connected to the wire 270 and a movable contact 287 connected to the wire 275. With the described arrangement the "up" limit switch 200 is connected across the "down" winding 243, and both the switches 201 and 277 are connected across the "up" winding 244.

The "arm" limit switch 202, in addition to controlling operation of the switch 277, also controls operation of a switch 290 which controls illumination of a lamp 291 connected in series with the source 138. The switches 277 and 290 are arranged to operate simultaneously in response to operation of switch 202 and for this purpose, the switch 290 includes a movable contact 292 which cooperates with a fixed contact 293 and which is mechanically connected to the movable contat 278 of switch 277 and to a magnetic armature 294 surrounded by a coil 295 which is connected between the fixed contact 297 of switch 202 and the movable contact 292 of the switch 290.

The operation of the circuit arrangement shown in FIG. 7 may now be described. Initially, it will be assumed that the arm assembly 45 is in its upper rest position as shown in FIG. 1. For this position of the arm assembly, the operating member 210 of the switch 200 is actuated upwardly by bracket 212 so that the contacts 286 and 287 of switch 200 normally engage to short the "down" winding 243. At this time the "down" winding 243 is also shorted through another path including the normally closed contacts 254 and 257 of switch 250. Also, the contacts 263 and 266 of switch 251 normally engage to short the "up" winding 244. The switches 201, 202, 277 and 290 are normally open as shown in FIG. 1 when the arm assembly 45 is in its rest position.

In order to move the arm assembly 45 downwardly from its rest position shown in FIG. 1 to its weld position shown in FIG. 3, the operator actuates the "down" switch 251 by depressing the carrier 262 to effect engagement of contacts 264 and 267. This is effective to open the "up" winding 244 and since the "down" winding 243 is shorted by switch 250 and also now by switch 251, the motor shaft 144 rotates in a counterclockwise direction as viewed in FIG. 1 to displace the link 154 downwardly to effect pivotal movement of arm assembly 45 in a counterclockwise direction. As the bearing 146 rotates in a counterclockwise direction, the operating member 210 of switch 200 is released to open contacts 286 and 287 which opens one shorting circuit for the "down" winding 243. However, this winding remains shorted by continued depression of the carrier 262 of the switch 251, and as long as carrier 262 of switch 251 is held in its down position, the arm assembly 45 pivots downwardly towards its weld position.

When the arm assembly 45 arrives at its weld position shown in FIG. 3, the deflectible rods 80 and 81 are deflected upwardly as viewed in FIG. 3 and the rod 80 elevates the operator member 231 of "arm" switch 202 to close the contacts 297 and 298 which effects energization of coil 295 to displace the armature 294 downwardly which results in engagement of the contacts of switches 277 and 290. Closure of switch 290 results in energization of the lamp 291 which indicates that a weld can be performed at this time. Closure of switch 277 shorts the "up" winding 244 and since the "down" winding 243 is still shorted by the switch 250, the rotation of the motor is terminated very quickly by dynamic braking. The operator now releases the carrier 262 of switch 251 which returns to its normal illustrated position by compression of the spring 268. The weld operation is now performed, either manually by closure of switch 139 or automatically after a short delay in response to closure of the switch 202, for example. The switch 202 is normally employed to determine the "down" stop and the switch 201 is utilized to stop the motor if no work is in position so as to prevent damage to the welding device.

When the welding operation is completed, the arm assembly 45 is elevated to its rest position. This is accomplished by the operator depressing the carrier 253 of switch 250 to close the contacts 255 and 258 which opens the "down" winding 243. Since the "up" winding 244 is at this time shorted by both the switches 251 and 277, the motor is rotated in a direction to elevate the arm assembly 45. Such elevation results in opening of switch 202 to deenergize the winding 295 which results in opening of switches 277 and 290. Opening of switch 290 is effective to extinguish the lamp 291. Opening of switch 277 opens one of the shorting circuits for the "up" winding 244. However, this winding remains shorted by continued depression of the carrier 253 of switch 250, and also by switch 251 which is in its normal position illustrated in FIG. 7. When the bearing 146 has been rotated to a position wherein the bracket 212 closes switch 200, the "down" winding 243 becomes shorted and since the "up" winding 244 is also shorted at this time by both switches 250 and 251, rotation of the motor is very quickly stopped by dynamic braking and upward movement of the arm assembly 45 is terminated. The operator now releases the carrier 253 of switch 250 which returns to its normal position and establishes a shorting circuit for the "down" winding 243 in addition to that established by the now closed switch 200. The circuit is now in its original condition and is effective to cause downward movement of the arm assembly 45 in response to depression of the carrier 262 of switch 251 as previously described.

It is apparent from the above description of the novel circuit arrangement that the motor can be stopped very quickly to terminate movement of the arm assembly 45 in any position of its path of travel merely by the operator releasing the carrier of the actuated one of the switches 250 and 251. To illustrate this, assume that the carrier 262 of switch 251 is depressed and that the arm assembly 45 is moving from its rest position towards its weld position. At this time, the "down" winding 243 is shorted by the switch 250 in its normal illustrated position and the "up" winding 244 is opened by reason of the actuated condition of switch 251. If for some reason the operator wishes to stop the motor, he merely releases the carrier 262 which returns automatically to its normal position to short the "up" winding 244 and stop the motor. If desired, the motor can now be reversed merely by depressing the carrier 253 of switch 250 which shorts the "up" winding 244 and causes motor rotation in the direction to move the arm assembly 45 towards its rest position.

While I have shown and described particular embodiments of my invention, it will be obvious to those skilled in the art that various changes and modifications may be made without departing from my invention in its broader

What I claim and desire to secure by Letters Patent of the United States is:

1. A welding device comprising in combination, electrode means adapted for engagement with a workpiece, support means mounting said electrode means for pivotal movement about an axis along a generally vertically extending arcuate path between spaced rest and second positions, and also mounting said electrode means for translatory movement along a generally vertically extending path generally perpendicular to said axis between said second position and a weld position spaced from the second position, said axis being spaced horizontally from a vertical line which includes said path of translatory movement and which intersects the workpiece, and means including an electric motor drivingly connected to a part of said support means and operable to effect pivotal movement of said electrode means from its rest position to its second position, and to effect translatory movement of said electrode means from its second position to its weld position in response to arrival of said electrode means at its second position.

2. A welding device comprising in combination, electrode means adapted for engagement with a workpiece, support means mounting said electrode means for pivotal movement about an axis along an arcuate path between spaced rest and second positions, and also mounting said electrode means for translatory movement along a path generally perpendicular to said axis between said second position and a weld position spaced from the second position, and means including drive means drivingly connected to a part of said support means and operable to effect pivotal movement of said electrode means from its rest position to its second position, and to effect translatory movement of said electrode means from its second position to its weld position in response to arrival of said electrode means at its second position, said support means including elongated deflectable means having a free end and carrying at its free end said electrode means, said deflectable means being deflectable in response to engagement of said electrode means with a workpiece to establish a follow up force which is applied to said electrode means during a welding operation.

3. A welding device comprising in combination, a base, electrode means adapted for engagement with a workpiece mounted on said base, support means carried by said base and mounting said electrode means for pivotal movement about an axis along a generally vertically extending arcuate path between spaced rest and second positions, and also mounting said electrode means for translatory movement along a generally vertically extending path generally perpendicular to said axis between said second position and a weld position spaced from the second position, said axis being spaced horizontally from a vertical line which includes said path of translatory movement and which intersects the workpiece, means including an electric motor drivingly connected to a part of said support means and operable to effect pivotal movement of said electrode means from its rest position to its second position, and to effect translatory movement of said electrode means from its second position to its weld position in response to arrival of said electrode means at its second position, and means mounting said support means for limited adjustment relative to said base in vertical directions to permit accommodation of various height workpieces.

4. A welding device comprising in combination, electrode means adapted for engagement with a workpiece, support means mounting said electrode means for pivotal movement about an axis along an arcuate path between spaced rest and second positions, and also mounting said electrode means for translatory movement along a path generally perpendicular to said axis between said second position and a weld position spaced from the second position, means including drive means drivingly connected to a part of said support means and operable to effect pivotal movement of said electrode means from its rest position to its second position, and to effect translatory movement of said electrode means from its second position to its weld position in response to arrival of said electrode means at its second position, said support means including elongated deflectable means having a free end and carrying at its free end said electrode means, said deflectable means being deflectable in response to engagement of said electrode means with a workpiece to establish a follow up force which is applied to said electrode means during a welding operation, and means mounting said support means for adjustment in the direction of translatory movement of said electrode means.

5. A welding device comprising in combination, electrode means adapted for engagement with a workpiece, support means mounting said electrode means for pivotal movement about an axis along an arcuate path between spaced rest and second positions, and also mounting said electrode means for translatory movement along a path generally perpendicular to said axis between said second position and a weld position spaced from the second position, means including drive means drivingly connected to a part of said support means and operable to effect pivotal movement of said electrode means from its rest position to its second position, and to effect translatory movement of said electrode means from its second position to its weld position in response to arrival of said electrode means at its second position, said support means including elongated electroconductive deflectable means having a free end and carrying at its free end said electrode means, said deflectable means being deflectable in response to engagement of said electrode means with a workpiece to establish a follow up force which is applied to said electrode means during a welding operation, and terminal means connected to said deflectable means effective when energized to supply current to said electrode means through said deflectable means.

6. A welding device comprising in combination, a base, electrode means adapted for engagement with a workpiece mounted on said base, support means carried by said base and mounting said electrode means for pivotal movement about an axis along an arcuate path between spaced rest and second positions, and also mounting said electrode means for translatory movement along a path generally perpendicular to said axis between second position and a weld position spaced from the second position, means including drive means drivingly connected to a part of said support means and operable to effect pivotal movement of said electrode means from its rest position to its second position, and to effect translatory movement of said electrode means from its second position to its weld position in response to arrival of said electrode means at its second position, said support means including elongated electroconductive deflectable means having a free end and carrying at its free end said electrode means, said deflectable means being deflectable in response to engagement of said electrode means with a workpiece to establish a follow up force which is applied to said electrode means during a welding operation, terminal means connected to said deflectable means effective when energized to supply current to said electrode means through said deflectable means, and means mounting said support means for limited adjustment relative to said base in vertical directions to permit accommodation of various height workpieces.

7. A welding device comprising in combination, electrode means adapted for engagement with a workpiece, support means mounting said electrode means for pivotal movement about an axis along an arcuate path between spaced rest and second positions, and also mounting said electrode means for translatory movement along a path generally perpendicular to said axis between said second position and a weld position spaced from the second position, means including drive means drivingly connected to a part of said support means and operable to effect pivotal movement of said electrode means from its rest position to its second position, and to effect translatory movement of said electrode means from its second position to its weld position in response to arrival of said electrode means at its second position, said support means including elongated deflectable means having a free end and carrying at its free end said electrode means, said deflectable means being deflectable in response to engagement of said electrode means with a workpiece to establish a follow up force which is applied to said electrode means during a welding operation, said drive means including a reversible electric motor, and means for controlling energization of said motor including a limit switch positioned for actuation by said deflectable means in response to deflection thereof when said electrode means engages a workpiece.

8. A welding device comprising in combination, electrode means adapted for engagement with a workpiece, support means mounting said electrode means for pivotal movement about an axis along an arcuate path between spaced rest and second positions, and also mounting said electrode means for translatory movement along a path generally perpendicular to said axis between said second position and a weld position spaced from the second position, means including drive means drivingly connected to a part of said support means and operable to effect pivotal movement of said electrode means from its rest position to its second position, and to effect translatory movement of said electrode means from its second position to its weld position in response to arrival of said electrode means at its second position, said support means including elongated electroconductive deflectable means having a free end and carrying at its free end said electrode means, said deflectable means being deflectable in response to engagement of said electrode means with a workpiece to establish a follow up force which is applied to said electrode means during a welding operation, terminal means connected to said deflectable means effective when energized to supply current to said electrode means through said deflectable means, means mounting said support means for adjustment in the direction of translatory movement of said electrode means, said drive means including a reversible electric motor, and means for controlling energization of said motor including a limit switch positioned for actuation by said deflectable means in response to deflection thereof when said electrode means engages a workpiece.

9. A welding device comprising in combination, electrode means adapted for engagement with a workpiece, support means mounting said electrode means for pivotal movement about an axis along an arcuate path between spaced rest and second positions, and also mounting said electrode means for translatory movement along a path generally perpendicular to said axis between said second position and a weld position spaced from the second position, and means including drive means drivingly connected to a part of said support means and operable to effect pivotal movement of said electrode means from its rest position to its second position through a first distance at a first velocity, and to effect translatory movement of said electrode means from its second position to its weld position in response to arrival of said electrode means at its second position through a second distance less than said first distance and at a second velocity less than said first velocity.

10. A welding device comprising in combination, electrode means adapted for engagement with a workpiece, support means mounting said electrode means for pivotal movement about an axis along an arcuate path between spaced rest and second positions, and also mounting said electrode means for translatory movement along a path generally perpendicular to said axis between said second position and a weld position spaced from the second position, means including drive means drivingly connected to a part of said support means and operable to effect pivotal movement of said electrode means from its rest position to its second position, and to effect translatory movement of said electrode means from its second position to its weld position in response to arrival of said electrode means at its second position, said support means including elongated deflectable means having a free end and carrying at its free end said electrode means, said deflectable means being deflectable in response to engagement of said electrode means with a workpiece to establish a follow up force which is applied to said electrode means during a welding operation, and means adjustable along the length of said deflectable means for varying the follow up force established by said deflectable means.

11. A welding device comprising in combination, an elongated arm, electrode means carried by said arm at its free end for engagement with a workpiece, a frame mounting said arm at its other end for pivotal movement about an axis between spaced rest and second positions, support means mounitng said frame for translatory movement along a path generally perpendicular to said axis between spaced rest and weld positions, resilient means urging said frame towards its rest position, said arm and said frame including engageable parts which are spaced when said arm and said frame are in their rest positions and which engage when said arm is in its second position and said frame is in its rest position, and drive means connected to said arm operable to effect pivotal movement of said arm from its rest position to its second position, and to effect translatory movement of said frame and said arm as a unit from the rest position of said frame to its weld position in response to engagement of said parts.

12. A welding device comprising in combination, an elongated arm, electrode means carried by said arm at its free end for engagement with a workpiece, a frame mounting said arm at its other end for pivotal movement about an axis between spaced rest and second positions, support means mounting said frame for translatory movement along a path generally perpendicular to said axis between spaced rest and weld positions, resilient means urging said frame towards its rest position, said arm and said frame including engageable parts which are spaced when said arm and said frame are in their rest positions and which engage when said arm is in its second position and said frame is in its rest position, and drive means connected to said arm operable to effect pivotal movement of said arm from it rest position to its second position, and to effect translatory movement of said frame and said arm as a unit from the rest position of said frame to its weld position in response to engagement of said parts, said drive means comprising a reversible electric motor mounted on said support means, a bearing rotated by said motor about an axis spaced from and parallel to the central axis of the bearing, and a link having one end loose on said bearing and having its other end pivotally connected to said arm.

13. A welding device comprising in combination, an elongated arm, electrode means carried by said arm at its free end for engagement with a workpiece, a frame mounting said arm at its other end for pivotal movement about an axis between spaced rest and second positions, support means mounting said frame for translatory movement along a path generally perpendicular to said axis between spaced rest and weld positions, resilient means urging said frame towards its rest position, said arm and said frame including engageable parts which are spaced when said arm and said frame are in their rest positions and which engage when said arm is in its second position and said frame is in its rest position, drive means connected to said arm operable to effect pivotal movement of said arm from its rest position to its second position, and to effect translatory movement of said frame and said arm as a unit from the rest position of said frame to its weld position in response to engagement of said parts, elongated electro-conductive deflectable rod means extending generally parallel to said arm and secured at one of its ends to said other end of said arm, said rod means supporting at its free end said electrode means and being deflectable in response to engagement of said electrode means with a workpiece to establish a follow up force which is applied to said electrode means during a welding operation, and terminal means connected to said rod means at said one end thereof effective when energized to supply current to said electrode means through said rod means.

14. A welding device comprising in combination, an elongated arm, electrode means carried by said arm at its free end for engagement with a workpiece, a frame mounting said arm at its other end for pivotal movement about an axis between spaced rest and second positions, support means mounting said frame for translatory movement along a path generally perpendicular to said axis between spaced rest and weld positions, resilient means urging said frame towards its rest position, said arm and said frame including engageable parts which are spaced when said arm and said frame are in their rest positions and which engage when said arm is in its second position and said frame is in its rest position, drive means connected to said arm operable to effect pivotal movement of said arm from its rest position to its second position, and to effect translatory movement of said frame and said arm as a unit from the rest position of said frame to its weld position in response to engagement of said parts, elongated electro-conductive deflectable rod means extending generally parallel to said arm and secured at one of its ends to said other end of said arm, said rod means supporting at its free end said electrode means and being deflectable in response to engagement of said electrode means with a workpiece to establish a follow up force which is applied to said electrode means during a welding operation, terminal means connected to said rod means at said one end thereof effective when energized to supply current to said electrode means through said rod means, said drive means including a reverisble electric motor, and means for controlling energization of said motor including a limit switch positioned for actuation by said deflectable means in response to deflection thereof when said electrode means engages a workpiece.

15. A welding device comprising in combination, an elongated arm, electrode means carried by said arm at its free end for engagement with a workpiece, a frame mounting said arm at its other end for pivotal movement about an axis between spaced rest and second positions, support means mounting said frame for translatory movement along a path generally perpendicular to said axis between spaced rest and weld positions, resilient means urging said frame towards its rest position, said arm and said frame including engageable parts which are spaced when said arm and said frame are in their rest positions and which engage when said arm is in its second position and said frame is in its rest position, drive means connected to said arm operable to effect pivotal movement of said arm from its rest position to its second position, and to effect translatory movement of said frame and said arm as a unit from the rest position of said frame to its weld position in response to engagement of said parts, said drive means comprising a reversible electric motor mounted on said support means, a bearing rotated by said motor about an axis spaced from and parallel to the central axis of the bearing, a link having one end loose on said bearing and having its other end pivotally connected to said arm, elongated electroconductive deflectable rod means extending generally parallel to said arm and secured at one of its ends to said other end of said arm, said rod means supporting at its free end said electrode means and being deflectable in response to engagement of said electrode means with a workpiece to establish a follow up force which is applied to said electrode means during a welding operation, and terminal means connected to said rod means at said one of its ends effective when energized to supply current to said electrode means through said rod means.

16. A welding device comprising in combination, an elongated arm, electrode means carried by said arm at its free end for engagement with a workpiece, a frame mounting said arm at its other end for pivotal movement about an axis between spaced rest and second positions, support means mounting said frame for translatory movement along a path generally perpendicular to said axis between spaced rest and weld positions, resilient means urging said frame towards its rest position, said arm and said frame including engageable parts which are spaced when said arm and said frame are in their rest positions and which engage when said arm is in its second position and said frame is in its rest position, drive means connected to said arm operable to effect pivotal movement of said arm from its rest position to its second position, and to effect translatory movement of said frame and said arm as a unit from the rest position of said frame to its weld position in response to engagement of said parts, said drive means comprising a reversible electric motor mounted on said support means, a bearing rotated by said motor about an axis spaced from and parellel to the central axis of the bearing, a link having one end loose on said bearing and having its other end pivotally connected to said arm, elongated electroconductive deflectable rod means extending generally parallel to said arm and secured at one of its ends to said other end of said arm, said rod means supporting at its free end said electrode means and being deflectable in response to engagement of said electrode means with a workpiece to establish a follow up force which is applied to said electrode means during a welding operation, terminal means connected to said rod means at one of its ends effective when energized to supply current to said electrode means through said rod means, a guide having an opening through which a portion of said rod means extends, and means mounting said guide for adjustment longitudinally of said rod means.

17. A welding device comprising in combination, a base, post means upstanding from said base, a carrier slidable on said post means including veritcally spaced upper and lower parts, a vertically extending screw rotatably mounted by said base in threaded engagement with said carrier, a frame slidable on said post means relative to said carrier between an upper rest position and a lower weld position defined by said parts of said carrier, spring means between said frame and the lower part of said carrier urging said frame to its upper rest position, an elongated arm mounted at one of its ends by said frame for pivotal movement about a horizontal axis between an upper rest position and a lower second position, deflectable rod means secured to said one end of said arm and extending towards the free end of said arm, electrode means supported by said rod means at the free end of said arm for engagement with a workpiece, said rod means being deflectable in response to engagement of said electrode means with a workpiece to establish a follow up force which is applied to said electrode means during a welding operation, said frame having a ledge underlying a portion of said arm and spaced therefrom when the arm and the frame are in their upper rest positions, said arm when pivoted to its lower second position engaging said ledge, and drive means on said carrier connected to said arm and effective when actuated to pivot said arm from its upper rest position to its lower second position, and to move said frame and said arm downwardly as a unit against said spring means relative to said carrier in response to engagement of said arm with said ledge, said screw when rotated being effective to adjust said carrier, said frame, said arm, and said drive means all as a unit relative to said base.

18. A welding device comprising in combination, a base, post means upstanding from said base, a carrier slidable on said post means including vertically spaced upper and lower parts, a vertically extending screw rotatably mounted by said base in threaded engagement with said carrier, a frame slidable on said post means relative to said carrier between an upper rest position and a lower weld position defined by said parts of said carrier, spring means between said frame and the lower part of said carrier urging said frame to its upper rest position, an elongated arm mounted at one of its ends by said frame for pivotal movement about a horizontal axis between an upper rest position and a lower second position, deflectable rod means secured to said one end of said arm and extending towards the free end of said arm, electrode means supported by said rod means at the free end of said arm for engagement with a workpiece, said rod means being deflectable in response to engagement of said electrode means with a workpiece to establish a follow up force which is applied to said electrode means during a welding operation, said frame having a ledge underlying a portion of said arm and spaced therefrom when the arm and the frame are in their upper rest positions said arm when pivoted to its lower second position engaging said ledge, drive means on said carrier connected to said arm and effective when actuated to pivot said arm from its upper rest position to its lower second position, and to move said frame and said arm downwardly as a unit against said spring means relative to said carrier in response to engagement of said arm with said ledge, said screw when rotated being effective to adjust said carrier, said frame, said arm, and said drive means all as a unit relative to said base, said drive means including a reversible electric motor, and means for controlling energization of said motor including a limit switch positioned for actuation by said deflectable means in response to deflection thereof when said electrode means engages a workpiece.

19. A welding device comprising in combination, a base, post means upstanding from said base, a carrier slidable on said post means including vertically spaced upper and lower parts, a vertically extending screw rotatably mounted by said base in threaded engagement with said carrier, a frame slidable on said post means relative to said carrier between an upper rest position and a lower weld position defined by said parts of said carrier, spring means between said frame and the lower part of said carrier urging said frame to its upper rest position, an elongated arm mounted at one of its ends by said frame for pivotal movement about a horizontal axis between an upper rest position and a lower second position, deflectable electro-conductive rod means secured to said one end of said arm and extending towards the free end of said arm, electrode means supported by said rod means at the free end of said arm for engagement with a workpiece, said rod means being deflectable in response to engagement of said electrode means with a workpiece to establish a follow up force which is applied to said electrode means during a welding operation, said frame having a ledge underlying a portion of said arm and spaced therefrom when the arms and the frame are in their upper rest positions, said arm when pivoted to its lower second position engaging said ledge, drive means on said carrier connected to said arm and effective when actuated to pivot said arm from its upper rest position to its lower second position, and to move said frame and said arm downwardly as a unit against said spring means relative to said carrier in response to engagement of said arm with said ledge, said screw when rotated being effective to adjust said carrier, said frame, said arm, and said drive means all as a unit relative to said base, a guide having an opening through which a portion of said rod means extends, means mounting said guide for adjustment longitudinally of said rod means, and terminal means connected to said rod means effective when energized to supply current to said electrode means through said rod means.

20. A welding device comprising in combination, electrode means adapted for engagement with a workpiece, support means mounting said electrode means for movement between spaced upper rest and lower weld positions, means including a reversible electric motor effective when energized to move said electrode means between said rest and weld positions, said motor including a field winding and a pair of up and down windings, said motor being effective to move said electrode means towards said weld position when said field winding is energized, said down winding is shorted, and said up winding is open, and to move said electrode means towards said rest position when said field winding is energized, said up winding is shorted and said down winding is open, said motor being ineffective to move said electrode means when both of said up and down windings are shorted, an up limit switch connected across said down winding arranged to be closed to short said down winding when said electrode means is at its rest position, and arranged to be open to open said down winding when said electrode means is in any other position, a down limit switch connected across said up winding arranged to be closed to short said up winding when said electrode means is at its weld position, and arranged to be open to open said up winding when said electrode means is in any other position, a manually operable down control switch having a movable contact movable between first and second spaced fixed contacts, the movable contact of said down control switch normally engaging its first fixed contact and being movable into engagement with its second fixed contact to effect movement of said electrode means towards its weld position, said first fixed contact and said movable contact of said down control switch being connected across said up winding to short the up winding when engaged and to open the up winding when disengaged, said second fixed contact and said movable contact of said down control switch being connected across said down winding to short the down winding when engaged and to open the down winding when disengaged, and a manually operable up control switch having a movable contact movable between first and second spaced fixed contacts, the movable contact of said control switch normally engaging its first fixed contact and being movable into engagement with its second fixed contact to effect movement of said electrode means towards its rest position, said first fixed contact and said movable contact of said up control switch being connected across said down winding to short the down winding when engaged and to open the down winding when disengaged, said second fixed contact and said movable contact of said up control switch being connected across said up winding to short the up winding when engaged and to open the up winding when disengaged.

21. A welding device comprising in combination, electrode means adapted for engagement with a workpiece, support means mounting said electrode means for movement between spaced upper rest and lower weld positions, means including a reversible electric motor effective when energized to move said electrode means between said rest and weld positions, said motor including a field winding and a pair of up and down windings, said motor being effective to move said electrode means towards said weld position when said field winding is energized said down winding is shorted, and said up winding is open, and to move said electrode means towards said rest position when said field winding is energized, said up winding is shorted and said down winding is open, said motor being ineffective to move said electrode means when both of said up and down windings are shorted, an up limit switch connected across said down winding arranged to be closed to short said down winding when said electrode means is at its rest position, and arranged to be open to open said down winding when said electrode means is in any other position, a down limit switch connected across said up winding arranged to be closed to short said up winding when said electrode means is at its weld position, and arranged to be open to open said up winding when said electrode means is in any other position, a manually operable down control switch having a movable contact movable between first and second spaced fixed contacts, the movable contact of said down control switch normally engaging its first fixed contact and being movable into engagement with its second fixed contact to effect movement of said electrode means towards its weld position, said first fixed contact and said movable contact of said down control switch being connected across said up winding to short the up winding when engaged and to open the up winding when disengaged, said second fixed contact and said movable contact of said down control switch being connected across said down winding to short the down winding when engaged and to open the down winding when disengaged, and a manually operable up control switch having a movable contact movable between first and second spaced fixed contacts, the movable contact of said up control switch normally engaging its first fixed contact and being movable into engagement with its second fixed contact to effect movement of said electrode means towards its rest position, said first fixed contact and said movable contact of said up control switch being connected across said down winding to short the down winding when engaged and to open the down winding when disengaged, said second fixed contact and said movable contact of said up control switch being connected across said up winding to short the up winding when engaged and to open the up winding when disengaged, said support means including elongated deflectable means carrying at its free end said electrode means, said deflectable means being deflectable in response to engagement of said electrode means with a workpiece to establish a follow up force which is applied to said electrode means during a welding operation, said down limit switch being poistioned for actuation by said deflectable means in response to deflection thereof when said electrode means engages a workpiece.

22. A welding device comprising in combination, electrode means adapted for engagement with a workpiece, support means mounting said electrode means for pivotal movement about an axis along an arcuate path between spaced upper rest positions and lower second positions, and also mounting said electrode means for translatory movement along a path generally perpendicular to said axis between said second position and a weld position spaced from and lower than said second position, means including a reversible electric motor effective when energized to move said electrode means between said rest and weld positions, said motor including a field winding and a pair of up and down windings, said motor being effective to move said electrode means towards said weld position when said field winding is energized, said down winding is shorted, and said up winding is open, and to move said electrode means towards said rest position when said field winding is energized, said up winding is shorted and said down winding is open, said motor being ineffective to move said electrode means when both of said up and down windings are shorted, an up limit switch connected across said down winding arranged to be closed to short said down winding when said electrode means is at its rest position, and arranged to be open to open said down winding when said electrode means is in any other position, a down limit switch connected across said up winding arranged to be closed to short said up winding when said electrode means is at its weld position, and arranged to be open to open said up winding when said electrode means is in any other position, a manually operable down control switch having a movable contact movable between first and second spaced fixed contacts, the movable contact of said down control switch normally engaging its first fixed contact and being movable into engagement with its second fixed contact to effect movement of said electrode means towards its weld position, said first fixed contact and said movable contact of said down control switch being connected across said up winding to short the up winding when engaged and to open the up winding when disengaged, said second fixed contact and said movable contact of said down control switch being connected across said down winding to short the down winding when engaged and to open the down winding when disengaged, and a manually operable up control switch having a movable contact movable between first and second spaced fixed contacts, the movable contact of said up control switch normally engaging its first fixed contact and being movable into engagement with its second fixed contact to effect movement of said electrode means towards its rest position, said first fixed contact and said movable contact of said up control switch being connected across said down winding to short the down winding when engaged and to open the down winding when disengaged, said second fixed contact and said movable contact of said up control switch being connected across said up winding to short the up winding when engaged and to open the up winding when disengaged.

23. A welding device comprising in combination, an elongated arm, electrode means carried by said arm at its free end for engagement with a workpiece, a frame mounting said arm at its other end for pivotal movement about an axis between spaced rest and second positions, support means mounting said frame for translatory movement along a path generally perpendicular to said axis between spaced rest and weld positions, resilient means urging said frame towards its rest position, said arm and said frame including engageable parts which are spaced when said arm and said frame are in their rest positions and which engage when said arm is in its second position and said frame is in its rest position, and drive means connected to said arm operable to effect pivotal movement of said arm from its rest position to its second position, and to effect translatory movement of said frame and said arm as a unit from the rest position of said frame to its weld position in response to engagement of said parts, said drive means including a reversible electric motor having a field winding and a pair of up and down windings, said motor being effective to move said electrode means towards said weld position when said field winding is energized, said down winding is shorted, and said up winding is open, and to move said electrode means towards said rest position when said field winding is energized, said up winding is shorted and said down winding is open, said motor being ineffective to move said electrode means when both of said up and down windings are shorted, an up limit switch connected across said down winding arranged to be closed to short said down winding when said electrode means is at its rest position, and arranged to be open to open said down winding when said electrode means is in any other position, a down limit switch connected across said up winding arranged to be closed to short said up winding when said electrode means is at its weld position, and arranged to be open to open said up winding when said electrode means is in any other position, a manually operable down control switch having a movable contact movable between first and second spaced fixed contacts, the movable contact of said down control switch normally engaging its first fixed contact and being movable into engagement with its second fixed contact to effect movement of said electrode means towards its weld position, said first fixed contact and said movable contact of said down control switch being connected across said up winding to short the up winding when engaged and to open the up winding when disengaged, said second fixed contact and said movable contact of said down control switch being connected across said down winding to short the down winding when engaged and to open the down winding when disengaged, and a manually operable up control switch having a movable contact movable between first and second spaced fixed contacts, the movable contact of said up control switch normally engaging its first fixed contact and being movable into engagement with its second fixed contact to effect movement of said electrode means towards its rest position, said first fixed contact and said movable contact of said up control switch being connected across said down winding to short the down winding when engaged and to open the down winding when disengaged, said second fixed contact and said movable contact of said up control switch being connected across said up winding to short the up winding when engaged and to open the up winding when disengaged.

24. A welding device comprising in combination, a base, post means upstanding from said base, a carrier slidable on said post means including vertically spaced upper and lower parts, a vertically extending screw rotatably mounted by said base in threaded engagement with said carrier, a frame slidable on said post means relative to said carrier between an upper rest position and a lower weld position defined by said parts of said carrier, spring means between said frame and the lower part of said carrier urging said frame to its upper rest position, an elongated arm mounted at one of its ends by said frame for pivotal movement about a horizontal axis between an upper rest position and a lower second position, deflectable rod means secured to said one end of said arm and extending towards the free end of said arm, electrode means supported by said rod means at the free end of said arm for engagement with a workpiece, said rod means being deflectable in response to engagement of said electrode means with a workpiece to establish a follow up force which is applied to said electrode means during a welding operation, said frame having a ledge underlying a portion of said arm and spaced therefrom when the arm and the frame are in their upper rest positions, said arm when pivoted to its lower second position engaging said ledge, and drive means on said carrier connected to said arm and effective when actuated to pivot said arm from its upper rest position to its lower second position, and to move said frame and said arm downwardly as a unit against said spring means relative to said carrier in response to engagement of said arm with said ledge, said screw when rotated being effective to adjust said carrier, said frame, said arm, and said drive means all as a unit relative to said base, said drive means including a reversible electric motor having a field winding and a pair of up and down windings, said motor being effective to move said electrode means towards said weld position when said field winding is energized, said down winding is shorted, and said up winding is open, and to move said electrode means towards said rest position when said field winding is energized, said up winding is shorted and said down winding is open, said motor being ineffective to move said electrode means when both of said up and down windings are shorted, an up limit switch connected across said down winding arranged to be closed to short said down winding when said electrode means is at its rest position, and arranged to be open to open said down winding when said electrode means is in any other position, a down limit switch connected across said up winding arranged to be closed to short said up winding when said electrode means is at its weld position, and arranged to be open to open said up winding when said electrode means is in any other position, a manually operable down control switch having a movable contact movable between first and second spaced fixed contacts, the movable contact of said down control switch normally engaging its first fixed contact and being movable into engagement with its second fixed contact to effect movement of said electrode means towards its weld position, said first fixed contact and said movable contact of said down control switch being connected across said up winding to short the up winding when engaged and to open the up winding when disengaged, said second fixed contact and said movable contact of said down control switch being connected across said down winding to short the down winding when engaged and to open the down winding when disengaged, and a manually operable up control switch having a movable contact movable between first and second spaced fixed contacts, the movable contact of said up control switch normally engaging its first fixed contact and being movable into engagement with its second fixed contact to effect movement of said electrode means towards its rest position, said first fixed contact and said movable contact of said up control switch being connected across said down winding to short the down winding when engaged and to open the down winding when disengaged, said second fixed contact and said movable contact of said up control switch being connected across said up winding to short the up winding when engaged and to open the up winding when disengaged.

25. A welding device comprising in combination, a base, an arm having a free end, electrode means carried by said arm at its free end for engagement with a workpiece mounted on said base, support means mounting said arm for pivotal movement about an axis to move said electrode means toward and away from said base, drive means connected to said arm operable to effect said pivotal movement of said arm, elongated electroconductive deflectable means having a free end, and being secured at its other end to said arm, said deflectable means supporting at its free end said electrode means and being deflectable in response to engagement of said electrode means with a workpiece to establish a follow up force which is applied to said electrode means during a welding operation, terminal means connected to said deflectable means at said other end thereof effective when energized to supply current to said electrode means through said deflectable means, said drive means including a reversible electric motor mounted on said support means, means for controlling said motor including a limit switch positioned for actuation in response to deflection of said deflectable means when said electrode means engages a workpiece to terminate rotation of said motor, and means mounting said support means for limited adjustment relative to said base in vertical directions to permit accommodation of various height workpieces.

26. A device as defined in claim 25 wherein said electrode means comprises two spaced electrodes adapted to engage the workpiece on a common side thereof, said deflectable means comprising two deflectable members each connected to a separate one of said electrodes.

27. A device as defined in claim 25 wherein said means for controlling said motor includes a pair of additional limit switches carried by said support means in spaced relation for actuation in response to opposite directions of rotation of said motor.

28. A device as defined in claim 25 wherein said drive means includes a bearing rotated by said motor about an axis spaced from and parallel to the central axis of the bearing, and connecting means mounted on said bearing and engaging said arm to effect pivotal movement of said arm in response to rotation of said motor.

29. A device as defined in claim 26 wherein said means for controlling said motor includes a pair of additional limit switches carried by said support means in spaced relation for actuation in response to opposite directions of rotation of said motor.

30. A device as defined in claim 29 wherein said drive means includes a bearing rotated by said motor about an axis spaced from and parallel to the central axis of the bearing, and connection means mounted on said bearing and engaging said arm to effect pivotal movement of said arm in response to rotation of said motor.

(References on following page)

References Cited

UNITED STATES PATENTS

| | | | |
|---|---|---|---|
| 2,123,182 | 7/1938 | Drake | 318—208 |
| 3,018,359 | 1/1962 | Roboski | 219—89 |
| 3,036,199 | 5/1962 | Page | 219—86 |
| 3,127,501 | 3/1964 | Mueller | 219—86 |
| 3,193,658 | 7/1965 | Seedorff | 219—86 |

RICHARD M. WOOD, *Primary Examiner.*

J. G. SMITH, *Examiner.*